United States Patent [19]

Matsuda

[11] Patent Number: 4,534,507
[45] Date of Patent: Aug. 13, 1985

[54] AIR TEMPERATURE REGULATING APPARATUS FOR VEHICLES

[75] Inventor: Tamotsu Matsuda, Wako, Japan

[73] Assignee: Honda Giken Kogyo Kabushiki Kaisha, Tokyo, Japan

[21] Appl. No.: 471,470

[22] Filed: Mar. 3, 1983

[30] Foreign Application Priority Data

Mar. 3, 1982 [JP] Japan ............... 57-29757[U]
Mar. 18, 1982 [JP] Japan ............... 57-38223[U]
Mar. 18, 1982 [JP] Japan ............... 57-38224[U]

[51] Int. Cl.$^3$ ............................................. G05D 23/00
[52] U.S. Cl. ............................ 237/12.3 A; 98/2.05; 165/46
[58] Field of Search ............ 237/12.3 A, 12.3 B; 98/2, 2.05; 236/13; 165/46

[56] References Cited

U.S. PATENT DOCUMENTS 3,217,788 11/1965 Adam ........................... 236/13 X
4,420,115 12/1983 Matsushima et al. ............. 98/2 X Primary Examiner—Henry Bennett
Attorney, Agent, or Firm—Armstrong, Nikaido, Marmelstein & Kubovcik

[57] ABSTRACT

Air temperature regulating apparatus for a vehicle including a unit case having an air-intake chamber, an air-intake window, a mixing chamber, and a heat exchanger mounted between the air-intake chamber and the mixing chamber. A side air exit, and a bottom air exit are provided in the mixing chamber. The heat exchanger includes plural air-heating passages with plural heat-radiating fins mounted in alternating ones of the passages and a damper slideably mounted in front of the exchanger variably adjustable to change an opening area of the passages. The exchanger can be formed of a flattened empty pipe having both ends remaining round with the pipe being bent in a zig-zag shape with the flattened portions extending horizontally. The heat-radiating fins in one portion of the exchanger can have a larger surface area than those mounted in an opposite portion. In the alternative, the relative heights of the air-heating passages can be changed from one end portion of the exchanger to another end portion of the exchanger.

4 Claims, 4 Drawing Figures

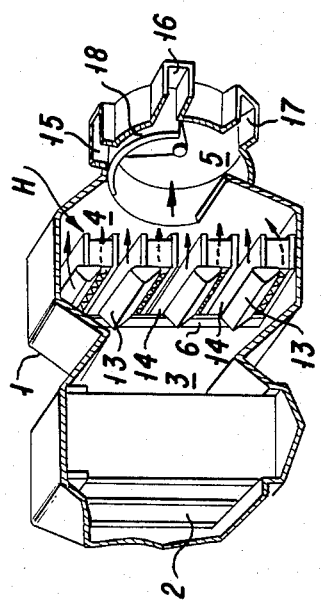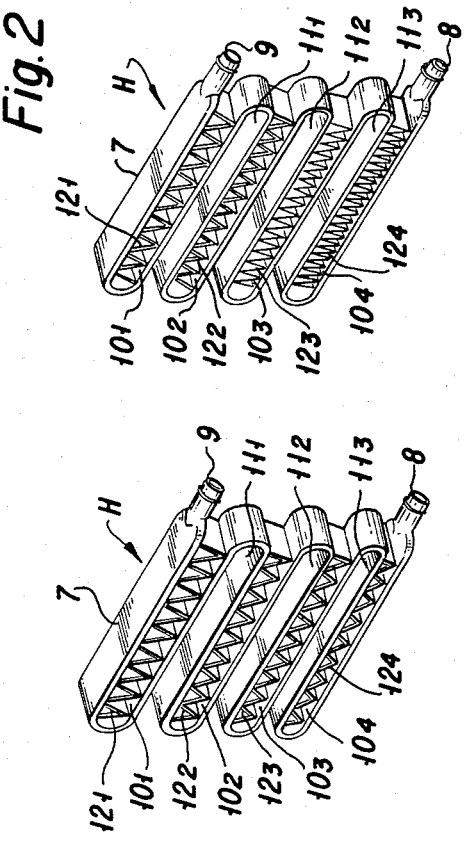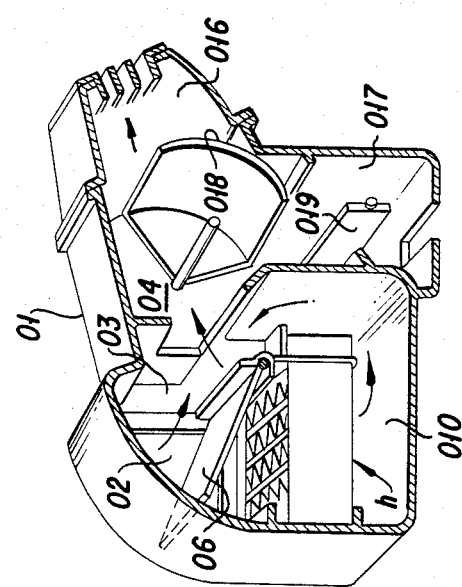

AIR TEMPERATURE REGULATING APPARATUS FOR VEHICLES

BACKGROUND OF THE INVENTION

A. Field of the Invention

The present invention relates to an air regulating apparatus for a vehicle such as an automobile, by which clean air having a suitably regulated temperature is brought into the passenger compartment of the automobile.

B. Description of the Prior Art

Generally speaking, in the case of providing suitably regulated air heated by a heat-exchanger into the passenger compartment of the automobile, it is desirable that the temperature of the air around the head of a driver or rider is set a little bit lower than average room temperature and the temperature around the feet of the driver or rider is set a little bit higher than average room temperature. Consequently, some kind of apparatus is necessary to provide air of such temperatures to the above-mentioned positions.

But, it has been difficult to regulate the air into the above-mentioned positions by old conventional apparatuses. Many problems have arisen; for example, the structure of such an apparatus has become complicated, big, and as the result, heavy.

Generally speaking, such an air regulating apparatus is constructed having air from outside of the automobile or from an evaporator of the cooler heated by a heat-exchanger. This heated air is mixed and regulated with unheated air. The regulated air is led into the passenger compartment of the automobile.

An old heat-exchanger for such an apparatus is constructed by arranging two water tanks spaced apart from each other with plural tubes running therebetween. The tubes are each welded to the tanks. Heat-radiating fins are separately welded to each of the plural tubes.

Consequently, it is difficult to manufacture this heat-exchanger because it has many spots to be welded, each of which is a potential point of water leakage. Furthermore, the two large volume water tanks result in an increase in the weight of the heat-exchanger itself.

SUMMARY OF THE INVENTION

Therefore, it is an object of the present invention to provide a compact and light weight air-regulating apparatus wherein a heat-exchanger in the air regulating apparatus has very few potential water leakage spots, and can be manufactured less expensively.

It is another object of the present invention to provide an air regulating apparatus wherein a heat-exchanger enables the provision of hot-air having temperature-difference layers without using additional equipment. It is a further object to provide an air regulating apparatus which is simple and compact.

The above objects are attained in an air temperature regulating apparatus for a vehicle which includes a unit case mounted in a front portion of the body of the vehicle having a fore portion, a rear portion, an air-intake chamber formed in the fore portion, an air intake window for intaking air to the air-intake chamber, a mixing chamber formed in the rear portion, a heat exchanger mounted between the air-intake chamber and the mixing chamber, one air exit in the mixing chamber for blowing out low temperature air, and another air exit in the mixing chamber for blowing out high temperature air. The heat exchanger comprises plural air-heating passages and unfined passages being alternately arranged, plural heat-radiating fins mounted in of the air-heating passages, and a damper slideably mounted in front of the heat exchanger variably adjustable to change an opening area of the heat air-heating passages. The exchanger is designed such that the temperature of air which flows past one end air-heating passage becomes gradually higher than the temperature of air which flows the opposite end air-heating passage.

The heat exchanger can be formed of a flattened empty pipe having both ends remaining round. The pipe is thereafter bent in a zig-zag shape with the flattened portions extending horizontally. The heat radiating fins are mounted in alternate passages formed between the zig-zag flattened portions. Consequently, in certain of the passages, the air is heated considerably more than in the alternating passages. The heat-radiating fins can be formed by corrugating a flat piece of metal. Because of the simple construction, the number of spots needing connecting by welding is decreased in comparison to the old-type heat-exchanger which was manufactured by spot welding all of the pieces together. Therefore, it is simple to manufacture the heat exchanger of the present invention. The problem of water leakage is considerably decreased. Further, the heat exchanger of the present invention does not have a large volume water tank when compared with a conventional exchanger. Consequently, it is small and compact.

Because of the passages having fins alternating with the passages without fins, it is quick and easy to mix hot-air and relatively unheated air because of having multiple layers formed in the mixing chamber.

The heat exchanger can be designed with the pitch between fins being smaller at the one end air-heating passage, thus present considerably more surface area for heat-exchange. Alternatively, the height between flattened portions; that is, the height of the passages can be substantially smaller at the one end air-heating passage when compared with the opposite end air-heating passage. In this manner, it is possible to change the heat-exchanging volume of each air-heating passage and, further, it is possible to automatically produce hot air which considerably varies with the air in another portion of the heat exchanger utilizing only a single heat exchanger without additional equipment.

Because it is easy to provide a wide temperature difference control between an upper part and a bottom part of the mixing chamber, it becomes possible to blow out hot air having a proposed temperature difference toward and around the head and the feet of riders in the automobile. Because a variable adjusting damper is mounted in front of the heat exchanger, it is simple to adjust the air-temperature blown into the mixing chamber by changing the opening area between the passages. Because the damper is slideable, it does not need a large space in the air temperature regulating apparatus as compared with the flap damper of the conventional apparatus. Consequently, the temperature regulation performance of the present invention is superior and because the apparatus is small and compact, it is easy to mount this in the front portion of the automobile. Further, the cost to manufacture the same is considerably reduced in comparison with the conventional apparatus.

BRIEF DESCRIPTION OF THE DRAWINGS

FIG. 1 is a longitudinal cross-sectional, perspective illustration of a first embodiment of air regulating apparatus in accordance with the present invention;

FIG. 2 is a perspective illustration of a first embodiment of a heat-exchanger, in accordance with the present invention;

FIG. 3 is a perspective illustration of a second embodiment of a heat-exchanger in accordance with the present invention; and FIG. 4 is a longitudinal cross-sectional, perspective illustration of old conventional type of air regulating apparatus.

DETAILED DESCRIPTION OF PREFERRED EMBODIMENTS

FIG. 4 shows a typical prior art air-regulating apparatus.

A unit-case 01 is mounted within the front portion of a body of an automobile.

The unit-case 01 comprises an air-intake chamber 03 having an air-intake window 02, an air-heating passage 010 in a lower portion of the air-intake chamber 03 which extends to a rear exit of said air-intake chamber 03, and a mixing chamber 04 which is rearwardly in the air-flow direction of said air-intake chamber 03. The rear exit of said air-intake chamber 03 and an exit of said air-heating passage 010 are separately connected to the mixing chamber 4.

A heat-exchanger h is mounted at the entrance of said air-heating passage 010.

A rear exit of said mixing chamber 04 goes through to the upper portion of the passenger compartment of the automobile through an upper-ventilating duct 016, and a downwardly directed exit of said mixing chamber 04 goes through to the lower portion of the passenger compartment of the automobile through a lower-ventilating duct 017.

A flap damper 06 which enables variably changing of a rate of air flow volume is mounted in the air-intake chamber 03. The air entering the air-intake chamber 03 is divided to go into the air-heating passage 010 or directly into the mixing chamber 04 by the flap damper 06.

A rotatable damper 018 which enables variable changing of the rate of air flow volume to the passenger compartment is mounted in the mixing chamber 04. The air entering the mixing chamber 04 is divided to go into the upper-ventilating duct 016 or into the lower-ventilating duct 017 by the rotatable damper 018. Further, a butterfly damper 019 which enables variable changing of the air-flow volume is mounted in the lower-ventilating duct 017.

Outside air introduced by a blower or regulating air from the evaporator having a cooler goes through the air-intake chamber 03 from the air-intake window 02 and the air which flows into the air-heating passage 010 is heated by the heat-exchanger h. The hot air so produced is divided into an upper flow and a lower flow at the exit of the air-heating passage 010. The upper flow flows into the mixing chamber 04, and there it is mixed with cold air which comes directly from air-intake chamber 03. The mixture of hot air and cold air is blown toward the upper part of the passenger compartment; namely, around the head of the rider through the upper-ventilating duct 016.

The lower-flow which flows into the mixing chamber 04 is mixed with a small volume of already mixed air, and after that, is blown toward the lower part of passenger compartment; namely, around the feet of the rider through the lower-ventilating duct 017.

Consequently, the air temperature of the air which flows toward the lower-ventilation duct 017 is lower than temperature of the air which flows toward the upper-ventilation duct 016 and so, the temperature of the air which blows into the lower part of the passenger compartment is higher than the temperature of the air which blows into the upper part of the passenger compartment.

This conventional apparatus has the following problems:

(a) Because the heated air and unheated-air flow separately and are mixed in the mixing chamber 04, it takes a large volume mixing chamber to mix them and furthermore, a guide is needed to have the air flow along a proposed path.

(b) Even though the volume of the mixing chamber 04 is enlarged, it is difficult to mix the heated and unheated air sufficiently. Thus, the proposed temperature-difference in the passenger compartment is difficult to obtain.

(c) A large space is needed to open and close the damper, especially said flap damper 06. Because the flap damper's weight is heavy, wind pressure is exerted against said flap damper 06, a strong effort is needed to open and close the flap damper 06. Furthermore, because the opening and closing stroke of the flap damper 06 is long, the control weight of opening and closing the flap damper 06 changes.

A first embodiment of the present invention is shown in FIG. 1 and FIG. 2. The air-intake chamber 3 having an air-intake window 2, is formed in front of the unit case 1 which is mounted within the engine compartment of the automobile with outside air being sent by a blower or regulated air from the evaporator of the cooler being sent to the air-intake chamber 3 through the air-intake window 2. A mixing chamber 4 in which heated air and unheated air are mixed is formed behind said unit case 1. Furthermore, a short cylindrical dividing chamber 5 being connected with mixing chamber 4 is formed behind the mixing chamber 4.

A heat-exchanger H which is long in its vertical dimension is set between said air-intake chamber 3 and the mixing chamber 4 in the unit-case 1.

A sliding damper 6, which is slideable in an up-and-down direction is set along the heat-exchanger H. The structure of the heat-exchanger H is explained based mainly upon FIG. 2.

A heat-pipe 7 is manufactured by flattening an empty pipe, for example, made of steel, with both ends remaining in their original shape. The flat pipe is then bent into zig-zag shape with the flattened portions extending horizontally. The heat pipe 7 thus formed has a flowing entrance 8 at the bottom end and a flowing exit 9 at the top end. The entrance 8 and exit 9 are connected to a cooling water circuit of the internal combustion engine of the automobile.

Between the flat portions of the zig-zag heat pipe 7, alternating plural passages $10_1$–$10_4$ and passages $11_1$–$11_3$ are formed in layers by the zig-zag heat pipe 7. Unitary heat-radiating fins $12_1$–$12_4$ which are formed by being bent in a corrugated shape are mounted in the air-heating passages $10_1$–$10_4$.

The fin pitch of the heat-radiating fins $12_1$–$12_4$ becomes gradually narrower downwardly. That is, the fin pitch of fin $12_4$ is narrower than that of fin $12_3$, that of fin $12_3$ is narrower than fin $12_2$, and that of fin $12_2$ is narrower than fin $12_1$.

It is possible for the sliding damper 6 in front of the heat-exchanger H to move upwardly and downwardly by operation of a manual control (not shown).

It is possible to variably adjust the rate of air-intake volume by sliding damper 6 which changes the window area of the air-heating passages $10_1$–$10_4$ and the unfinned passages $11_1$–$11_3$.

An air-flow guide 13 which is triangular in cross-section is mounted on the sliding damper 6 as an integral body in front of an air passage 14.

Behind the mixing chamber 4, there is a cylindrical dividing chamber 5 having an upper exit 15, a side exit 16 and a bottom exit 17.

While not shown in FIG. 1, the upper exit 15 goes to a defroster exit and the side exit 16 goes to the exit from which air is blown toward and around the rider's head in the upper portion of the passenger compartment and the bottom exit 17 goes to the exit from which air is blown toward and around the rider's feet in the lower portion of the passenger compartment.

A rotary damper 18 is mounted in the dividing chamber 5 and suitable controls (not shown) are provided to manually operate the same. The amount of opening of the upper exit 16 and the bottom exit 17 is variably adjusted by the rotary damper 18.

Next the operation of the first embodiment of the present invention shown in FIG. 1 and FIG. 2 is explained. Air from a blower or regulated air from an evaporator of a cooler flows into the air-intake chamber 3.

Hot-water from a cooling circuit is circulating in the heat pipe 7 of the heat-exchanger, and the heat pipe 7 and the heat-radiating fins $12_1$–$12_4$ are heated.

Air in the air-intake chamber 3 is heated when this air passes through the air-heating passages $10_1$–$10_4$ and the unfinned passages $11_1$–$11_3$ of the heat exchanger.

Air which passes through the air-heating passages $10_1$–$10_4$ having the heat-radiating fins $12_1$–$12_4$ is heated to high temperature, but the air which passes through the unfinned passages $11_1$–$11_3$ is only slightly heated.

And so, because many layers of high temperature air and relatively low temperature air flow into the mixing chamber 4, it is easy to mix the air.

The temperature of hot water which flows upward in the heat pipe 7 gradually decreases because of the heat exchanging process. Further, since the area of the heat-radiating fins $12_1$–$12_4$ of the air-heating passages $10_1$–$10_4$ becomes gradually greater downwardly, air which passes through the air-heating passage $10_4$ becomes heated to a higher temperature than that passing through passage $10_3$ while air through passage $10_3$ is heated more than that through $10_2$, Air through passage $10_2$ is heated more than that through $10_1$.

This means that the contacting area between the heat-pipe and the air gradually increases from the top of exchanger H to the bottom thereof.

And so, the many air layers flowing into mixing chamber 4 are formed to vary from a higher temperature near the bottom to a lower temperature near the top.

As the result, it is easy to mix the air even though the mixing chamber 4 has a comparatively small volume chamber. The upper hot-air having a temperature lower than the lower hot-air of the mixing chamber is blow out toward and around the head of the rider within the automobile from the side exit 16 and the lower hot-air having a temperature higher than the upper hot-air is blown out toward and around the feed of the rider within the automobile from lower exit 17. The hot-air from the upper exit 15 is led to the defroster.

The amount of open area of air-heating passages $10_1$–$10_4$ and unfinned passages $11_1$–$11_3$ is variably adjusted by sliding damper 6.

FIG. 3 shows the second embodiment of the invention. The structure of the heat-exchanger H of the second embodiment is different than that of of the first embodiment.

An up-and-down direction spacing between flat portions of the heat pipe 7 is varied in stead of changing the pitch of the heat-radiating fins $12_1$–$12_4$ mounted on each air-heating passage $10_1$–$10_4$, especially said up-and-down direction spacing of the lowermost air-heating passage $10_4$ is narrower than that of uppermost air-heating passage $10_1$. Up-and-down direction spacing gradually becomes greater upwardly. This variation in spacing produces the same effects as the above-described variations in fin pitches. It is readily apparent that the above-described air temperature regulating apparatus meets all of the objects mentioned above and others which will be seen by those of skill in the art.

It should be understood that the specific form of the invention is intended to be representative only, as certain modifications within the scope of these teachings will be apparent to those skilled in the art.

Accordingly, reference should be made to the following claims in determining the full scope of the invention.

What is claimed is:

1. An air temperature regulating apparatus for a vehicle including a unit case mounted in a front portion of a body of a vehicle having a fore portion, a rear portion, an air-intake chamber formed in the fore portion, an air-intake window for intaking air to said air-intake chamber, a single mixing chamber formed in the rear portion, a heat exchanger mounted between said air-intake chamber and said mixing chamber, one air exit in said mixing chamber for blowing out low temperature air, and another air exit in said mixing chamber for blowing out high temperature air, said heat exchanger comprising:

a flattened empty pipe having both ends remaining round, the pipe being bent in a zig-zag shape with the flattened portions extending horizontally, plural air-heating passages and unfinned passages being alternately arranged and defined between said flattened portions, plural heat-radiating fins mounted in said air-heating passages, said exchanger being designed such that the temperature of air which flows past one end air-heating passage becomes gradually higher than the temperature of air which flows past opposite end air-heating passage and such that the surface area of said heat-radiating fins being mounted on said one end air-heating passage becomes gradually higher than the surface area of said heat-radiating fins being mounted in said opposite end air-heating passage, and a damper mounted in front of said pipe variably adjustable to change an opening area of said air-heating passages.

2. An air temperature regulating apparatus for a vehicle including a unit case mounted in a front portion of a body of a vehicle having a fore portion, a rear portion, an air-intake chamber formed in the fore portion, an air-intake window for intaking air to said air-intake chamber, a single mixing chamber formed in the rear portion, a heat exchanger mounted between said air-intake chamber and said mixing chamber, one air exit in said mixing chamber for blowing out low temperature air, and another air exit in said mixing chamber for blowing out high temperature air, said heat exchanger comprising:

a flattened empty pipe having both ends remaining round, the pipe being bent in a zig-zag shape with the flattened portions extending horizontally, plural air-heating passages and unfinned passages being alternately arranged and defined between said flattened portions, plural heat-radiating fins mounted in said air-heating passages, said exchanger being designed such that the temperature of air which flows past one end air-heating passage becomes gradually higher than the temperature of air which flows past opposite end air-heating passage, said air-heating passages being designed such that the height of said one end air-heating passage gradually becomes lower than the height of said opposite end air-heating passage, and a damper mounted in front of said pipe variably adjustable to change an opening area of said air-heating passages.

3. An air regulating apparatus for vehicles according to claim 2, wherein said damper comprises plural slideable members mounted in front of said plural air-heating passages and adapted for vertical movement thereover covering and uncovering said air-heating passages to change their opening areas.

4. An air regulating apparatus for vehicles according to claim 1, wherein said damper comprises plural slideable members mounted in front of said plural air-heating passages and adapted for vertical movement thereover covering and uncovering said air-heating passages to change their opening areas.

* * * * *